(12) United States Patent
Lee et al.

(10) Patent No.: US 11,397,294 B2
(45) Date of Patent: Jul. 26, 2022

(54) DISPLAY DEVICE

(71) Applicant: LG ELECTRONICS INC., Seoul (KR)

(72) Inventors: Jeoungoun Lee, Seoul (KR); Sangmin Baek, Seoul (KR); Sanghun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 17/010,780

(22) Filed: Sep. 2, 2020

(65) Prior Publication Data

US 2021/0356652 A1 Nov. 18, 2021

(30) Foreign Application Priority Data

May 13, 2020 (WO) ................ PCT/KR2020/006310

(51) Int. Cl.
*F21V 8/00* (2006.01)

(52) U.S. Cl.
CPC ......... *G02B 6/0085* (2013.01); *G02B 6/0021* (2013.01); *G02B 6/0066* (2013.01)

(58) Field of Classification Search
CPC ............. G02B 6/0021; G02F 1/133314; G02F 1/133308; G02F 1/133317; G02F 1/13332; G02F 1/1333
See application file for complete search history.

(56) References Cited

U.S. PATENT DOCUMENTS

| 7,903,227 B2 | 3/2011 | Kang et al. |
| 9,720,269 B2 * | 8/2017 | Jung .................. G02F 1/133308 |
| 9,897,850 B2 * | 2/2018 | Yokawa ............ G02F 1/133603 |

(Continued)

FOREIGN PATENT DOCUMENTS

| JP | 2012-138300 | 7/2012 |
| JP | 2014-126706 | 7/2014 |

(Continued)

OTHER PUBLICATIONS

PCT International Application No. PCT/KR2020/006310, International Search Report dated Feb. 9, 2021, 4 pages.

*Primary Examiner* — William J Carter
(74) *Attorney, Agent, or Firm* — Lee, Hong, Degerman, Kang & Waimey PC (57) ABSTRACT

Provided is a display device. The display device includes a display panel, a light guide plate disposed behind the display panel, a light source module configured to emit light toward the light guide plate, a mounting housing on which the light source module is mounted, the mounting housing being made of a metal material, a back cover configured to cover the mounting housing from a rear side, a lower cover bent forward from a lower end of the back cover to cover the mounting housing from a lower side, a guide frame configured to surround a circumference of the display panel and cover the lower cover, a decor panel including a lower panel configured to cover the guide frame from a lower side and a front panel extending upward from a front end of the lower panel, a screw coupled to the lower cover by sequentially passing through the lower panel and the guide frame, and a heat insulating member disposed between a head of the screw and the lower panel.

13 Claims, 6 Drawing Sheets

(56) References Cited

U.S. PATENT DOCUMENTS

| | | | |
|---|---|---|---|
| 2006/0203519 A1* | 9/2006 | Shin | G02B 6/0088 |
| | | | 362/632 |
| 2012/0162566 A1 | 6/2012 | Shimomichi | |
| 2014/0152940 A1* | 6/2014 | Wang | G02B 6/0011 |
| | | | 349/62 |
| 2015/0160405 A1* | 6/2015 | Park | G02F 1/133308 |
| | | | 362/606 |

FOREIGN PATENT DOCUMENTS

| | | |
|---|---|---|
| KR | 10-0975572 | 8/2010 |
| KR | 20180044468 | 5/2018 |
| KR | 10-2049856 | 11/2019 |

* cited by examiner

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. PCT/KR2020/006310, filed on May 13, 2020, the contents of which are all hereby incorporated by reference herein in its entirety.

BACKGROUND

The present disclosure relates to a display device.

The display device is a device that displays image information received from the outside or image information stored therein. Representative display devices include televisions, monitors, laptops, and smart phones.

In particular, a liquid crystal display (LCD) includes an optical element such as a light emitting diode (LED) that emits light toward a light guide plate. Since high-temperature heat is generated in such an optical element, a design for solving the heat dissipation of the optical element is considered.

The display devices according to the related art perform heat dissipation by using a mounting housing that thermally contacts the optical element as a heatsink. However, there is a limitation in that the heat of the mounting housing is transferred to a front portion of the display device.

SUMMARY

Embodiments provide a display device in which transfer of heat generated in a light source module to a decor panel is minimized.

In one embodiment, a display device includes: a display panel; a light guide plate disposed behind the display panel; a light source module configured to emit light toward the light guide plate; a mounting housing on which the light source module is mounted, the mounting housing being made of a metal material; a back cover configured to cover the mounting housing from a rear side; a lower cover bent forward from a lower end of the back cover to cover the mounting housing from a lower side; a guide frame configured to surround a circumference of the display panel and cover the lower cover; a decor panel including a lower panel configured to cover the guide frame from a lower side and a front panel extending upward from a front end of the lower panel; a screw coupled to the lower cover by sequentially passing through the lower panel and the guide frame; and a heat insulating member disposed between a head of the screw and the lower panel.

A first through-hole through which the screw passes may be defined in the lower panel, a second through-hole through which the screw passes may be defined in the guide frame, and an inner circumference of the first through-hole and an inner circumference of the second through-hole may be spaced apart from an outer circumference of the screw.

A long hole extending in a horizontal direction may be defined in the lower panel, and the long hole may pass between the front panel and the screw with respect to a surface of the decor panel.

A recess portion which is recessed upward, in which the heat insulating member is disposed, and which communicates with the long hole may be defined in the lower panel.

A length of the long hole in the horizontal direction may be longer than that of the recess portion in the horizontal direction.

A plurality of protrusions protruding forward and contacting a rear surface of the mounting housing may be disposed on the back cover.

A recess groove recessed forward may be defined in the rear surface of the mounting housing, and the recess groove may communicate with a gap defined between a front surface of the back cover and the rear surface of the mounting housing.

The display device may further include a heat insulating pad provided between a rear surface of the mounting housing and a front surface of the back cover.

A recess groove recessed forward may be defined in the rear surface of the mounting housing, and the heat insulating pad may be configured to cover the recess groove from the rear side.

An opening in which an end of the screw is disposed may be defined in a bottom surface of the mounting housing.

In another embodiment, a display device includes: a display panel; a light guide plate disposed behind the display panel; a light source module configured to emit light toward the light guide plate; a mounting housing on which the light source module is mounted, the mounting housing being made of a metal material; a back cover configured to cover the mounting housing from a rear side; a lower cover bent forward from a lower end of the back cover to cover the mounting housing from a lower side; a guide frame configured to surround a circumference of the display panel and cover the lower cover; a decor panel including a lower panel configured to cover the guide frame from a lower side and a front panel extending upward from a front end of the lower panel; and a screw coupled to the lower cover by sequentially passing through the lower panel and the guide frame. The lower panel may include: a through-hole through which the screw passes; and a long hole which extends in a horizontal direction and passes through a front side of the through-hole.

An inner circumference of the through-hole may be spaced apart from an outer circumference of the screw.

The long hole may pass between the front panel and the through-hole with respect to a surface of the decor panel.

The display device may further include a heat insulating member having an annular shape and disposed between a head of the screw and the lower panel.

A cutoff hole extending backward may be defined in each of both ends of the long hole.

In further another embodiment, a display device includes: a display panel; a light guide plate disposed behind the display panel; a light source module configured to emit light toward the light guide plate; a mounting housing on which the light source module is mounted, the mounting housing being made of a metal material; a back cover configured to cover the mounting housing from a rear side; and a guide frame configured to surround a circumference of the display panel and a circumference of the back cover. A plurality of protrusions protruding forward and contacting a rear surface of the mounting housing may be disposed on the back cover.

A recess groove recessed forward may be defined in the rear surface of the mounting housing, and the recess groove may communicate with a gap defined between a front surface of the back cover and the rear surface of the mounting housing.

The details of one or more embodiments are set forth in the accompanying drawings and the description below.

Other features will be apparent from the description and drawings, and from the claims.

DETAILED DESCRIPTION OF THE EMBODIMENTS

Hereinafter, detailed embodiments will be described in detail with reference to the accompanying drawings.

Hereinafter, when an element is described as being "coupled" or "connected" to another element, it means that the two elements are directly coupled or connected, or a third element exists between the two elements, and the two elements are coupled or connected to each other by the third element. On the other hand, the "direct coupling" or "direct connecting" of one element to the other element may be understood that the third element does not exist between the two elements.

Figure 1:
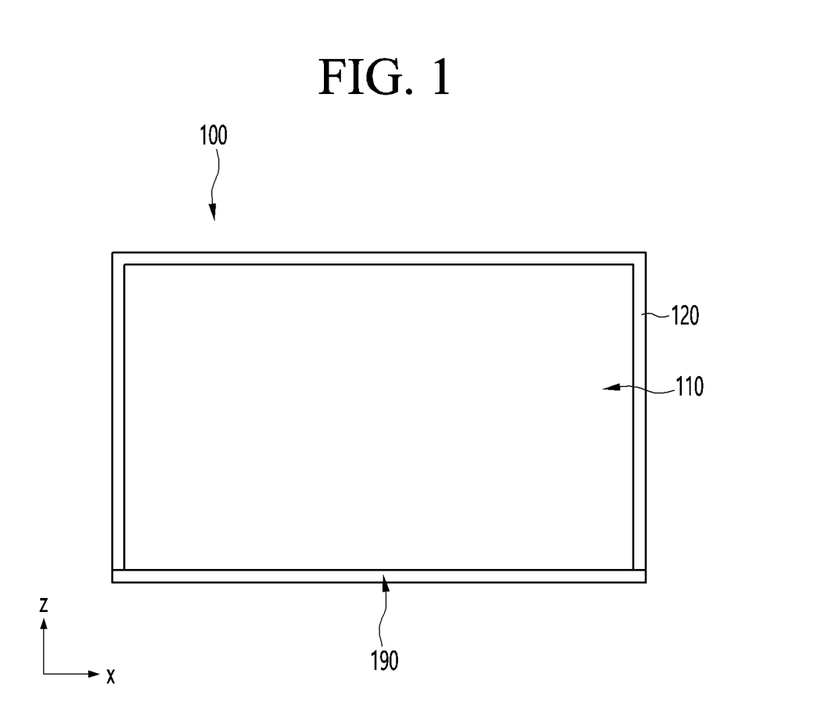
FIG. 1 is a front view of a display device according to an embodiment.
Figure 2:
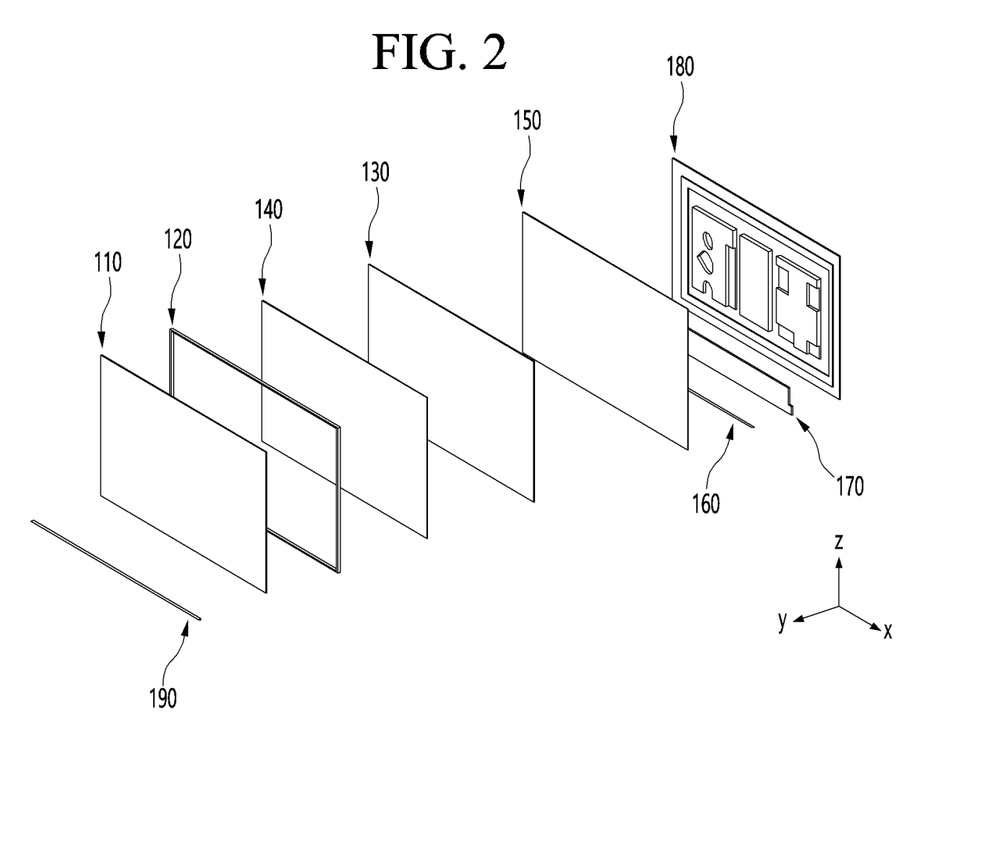
FIG. 2 is an exploded perspective view of the display device according to an embodiment.

FIG. 1 is a front view of a display device according to an embodiment, and FIG. 2 is an exploded perspective view of the display device according to an embodiment.

A display device 100 according to an embodiment may include a display panel 110, a guide frame 120, a light guide plate 130, a light source module 160, a mounting housing 170, a back cover 180, and a decor panel 190.

The display panel 110 may display an image. The display panel 110 may have a substantially rectangular shape. In more detail, the display panel 110 may include a pair of long sides and a pair of short sides. The pair of long sides may define an upper edge and a lower edge of the display panel 110, and the pair of short sides may define both edges of the display panel 110.

Hereinafter, a direction in which the display panel 110 is directed will be defined as a forward direction. Thus, an x-axis illustrated in the drawings may be parallel to a left and right direction, a y-axis may be parallel to a front-rear direction, and a z-axis may be parallel to a vertical direction.

The guide frame 120 may surround the display panel 110. The guide frame 120 may have a substantially rectangular frame shape. In more detail, the guide frame 120 may include an upper frame surrounding the upper edge of the display panel 110, a lower frame surrounding the lower edge of the display panel 110, and a pair of side frames surrounding both edges of the display panel 110.

The guide frame 120 may be integrally provided or may be provided by coupling a plurality of frames that are separable from each other.

The light source module 160, the mounting housing 170, and the light guide plate 130 may be referred to as a backlight unit (BLU).

The backlight unit may be divided into an edge type backlight unit and a direct type backlight unit. The edge type backlight unit may be configured so that the light source module emits light toward the edge of the light guide plate. The direct type backlight unit may be configured so that the light source module emits light toward the rear surface of the light guide plate.

Hereinafter, a case in which the backlight unit is provided as the edge type will be described as an example. However, the embodiment is not limited thereto, and it is apparent that the present disclosure may be applied even when the backlight unit is provided as the direct type.

The light guide plate 130 may be disposed behind the display panel 110. The light guide plate 130 may guide the light emitted from the light source module 160 to be described later toward the display panel 110.

An optical sheet 120 may be provided between the light guide plate 130 and the display panel 110. The optical sheet 120 may be attached to a front surface of the light guide plate 130. The optical sheet 120 may be provided in plurality. For example, the plurality of optical sheets 120 may include a diffusion sheet and a prism sheet.

Light incident into the light guide plate 130 may pass through the optical sheet 120 and then be incident into the display panel 110. That is, the optical sheet 120 may function as a surface light source that emits light toward the display panel 110.

A reflective sheet 150 may be attached to the rear surface of the light guide plate 130. The reflective sheet 150 may prevent light from leaking to a rear side of the light guide plate 130 and may reflect light in the light guide plate 130 toward the optical sheet 140 and the display panel 110.

The light source module 160 may be a linear light source. The light source module 160 may extend in the left and right direction and may include a plurality of light sources disposed in a row or in a plurality of rows.

The light source module 160 may emit light toward the light guide plate 130.

In more detail, the light source module 160 may emit light toward the lower edge of the light guide plate 130. The light source module 160 may be disposed below the light guide plate 130.

The light source module 160 may be mounted on the mounting housing 170. The mounting housing 170 may support the light source module 160 from a lower side. Also, the mounting housing 170 may cover the light source module 160 from a rear side. That is, a portion of the mounting housing 170 may be disposed behind the light guide plate 130 and the light source module 160, and the other portion of the mounting housing 170 may be disposed below the light guide plate 130 and the light source module 160.

The mounting housing 170 may extend in the left and right direction. The mounting housing 170 may have a height greater than that of the light source module 160. A length of the mounting housing 170 in the left and right direction may be greater than that of the light source module 160.

The mounting housing 170 may be made of a metal material. In more detail, the mounting housing 170 may be made of an aluminum material. Therefore, the mounting housing 170 may have high thermal conductivity, and thus, heat generated from the light source module 160 may be conducted to the mounting housing 170. That is, the mounting housing 170 may function as a heat sink of the light source module 160.

The back cover 180 may cover the mounting housing 170 from the rear side. Also, the back cover 180 may cover the light guide plate 130 from the rear side.

The back cover 180 may have a height greater than that of the mounting housing 170. The mounting housing 170 may be covered by a lower portion of the back cover 180.

The back cover 180 may be a pressed object. The back cover 180 may be made of a metal material. In more detail, the back cover 180 may be made of a steel material. The thermal conductivity of the back cover 180 may be less than that of the mounting housing 170.

Although not shown in the drawings, the display device 100 may further include a separate cover that covers the back cover 180 to define an outer appearance of the rear surface of the display device. However, the embodiment is not limited thereto, and the back cover 180 may also define an outer appearance of the rear surface of the display device 100.

The decor panel 190 may define an outer appearance of a front surface of the lower end of the display device 100. The decor panel 190 may extend in the left and right direction. The decor panel 190 may cover the guide frame 120, more specifically, the lower frame from the lower side. In addition, the decor panel 190 may cover the lower frame from the front side.

Figure 3:
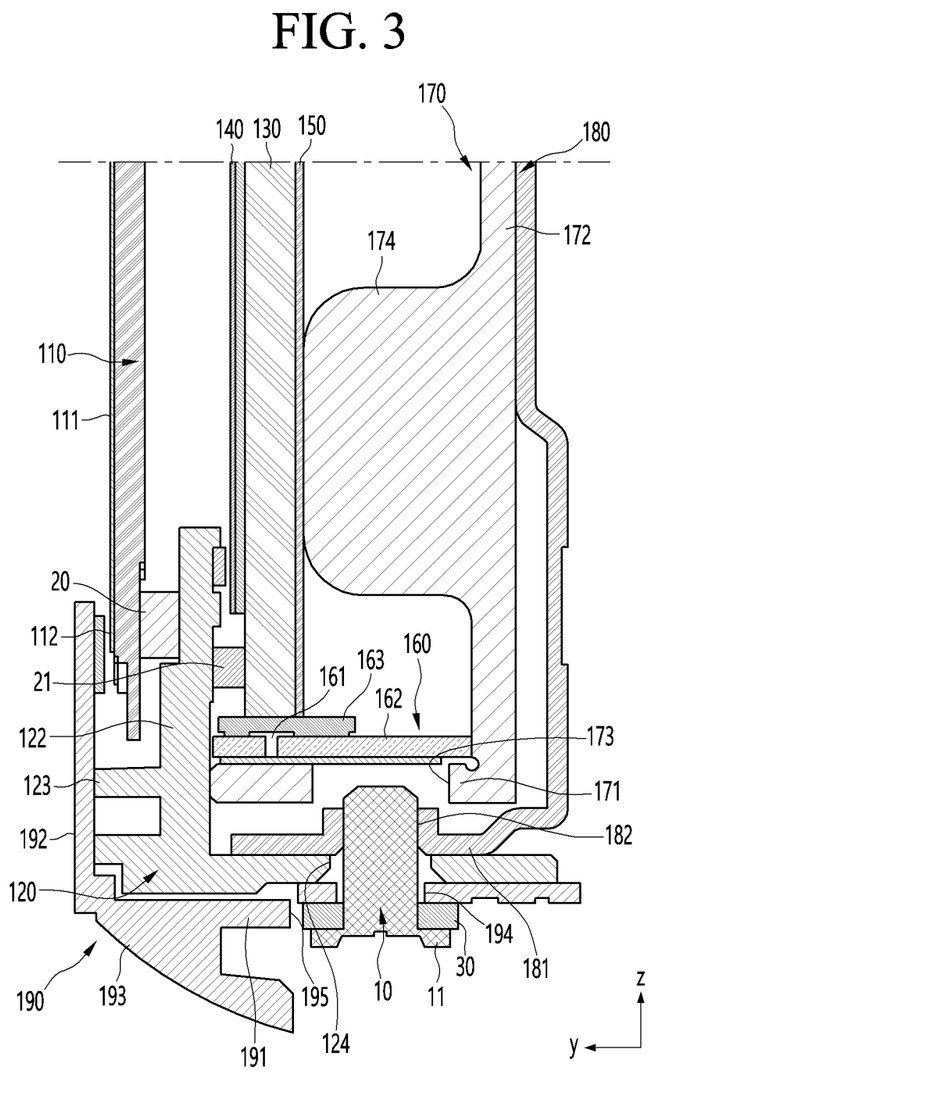
FIG. 3 is a cross-sectional view illustrating the inside of a lower portion of the display device according to an embodiment.
Figure 4:
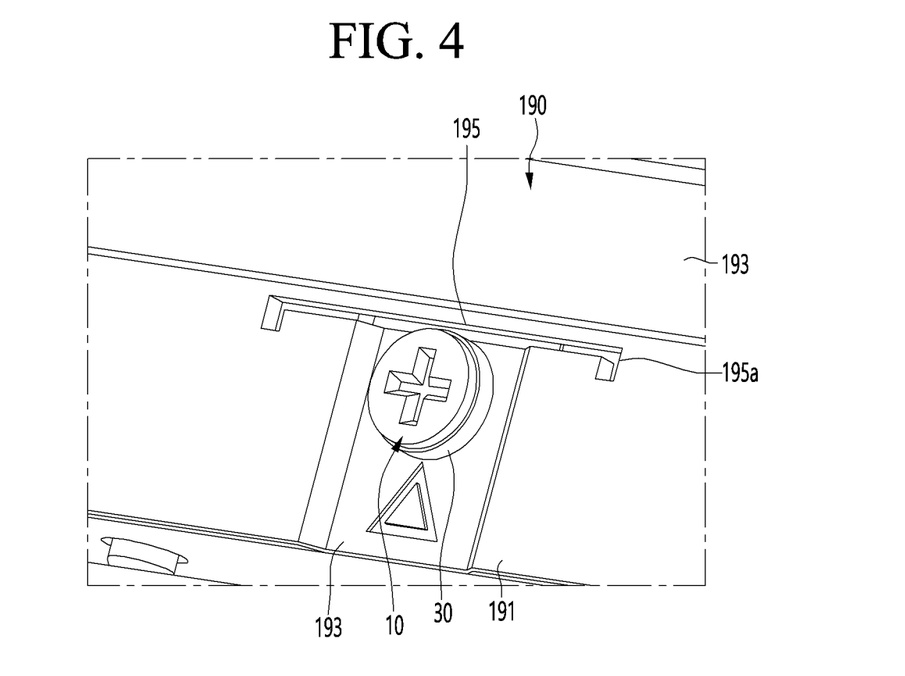
FIG. 4 is a view illustrating a lower panel of a decor panel according to an embodiment.

FIG. 3 is a cross-sectional view illustrating the inside of a lower portion of the display device according to an embodiment, and FIG. 4 is a view illustrating a lower panel of the decor panel according to an embodiment.

The front surface of the display panel 110 may include a display area 111, on which an image is displayed, and a non-display area 112 covered by a front panel 192 of the decor panel 190.

The decor panel 190 may include a lower panel 191 covering the guide frame 120 from the lower side and the front panel 192 extending upward from a front end of the lower panel 191. The decor panel 190 may further include a barrier 193 protruding downward from the lower panel 191.

The lower panel 191 of the decor panel 190 may define an outer appearance of the bottom surface of the display device 100. The lower panel 191 may cover the lower frame of the guide frame 120 from the lower side. The front end of the lower panel 191 may further protrude forward than the display panel 110. A rear end of the lower panel 191 may further protrude backward than the back cover 180 or may overlap the back cover 180 in a vertical direction.

The front panel 192 of the decor panel 190 may define an outer appearance of a lower end of the front surface of the display device 100. The front panel 192 may extend upward from the front end of the lower panel 191.

A portion of an upper portion of the front panel 192 may be disposed in front of the lower end of the front surface of the display panel 110. That is, the front panel 192 may cover the lower end of the front surface of the display panel 110 from the front side. The lower end of the front surface of the display panel 110 covered by the front panel 192 may be the non-display area 112.

The barrier 193 may protrude downward from the front portion of the lower panel 191. The barrier 193 may cover a head 11 of a screw 10 to be described later to minimize exposure of the head 11 to the front side and improve the outer appearance of the display device 100.

The barrier 193 may include a round surface connected to the front panel 192. The round surface may be provided to be reduced in height and gentle in inclination toward the rear side.

The round surface of the front panel 192 or the barrier 193 may function as an input unit that receives a user's command and may be provided with a touch panel, a switch, or a button that receives a user's touch. Thus, there is a need for a method of minimizing heat transferred from the light source module 160 to the front panel 192 and barrier 193 of the decor panel 190 so as to improve reliability of the display device 100. This will be described in detail later.

The guide frame 120 may surround the display panel 110, the light guide plate 130, and the back cover 180.

A protrusion 122 protruding between the display panel 110 and the light guide plate 130 may be disposed on the guide frame 120. The protrusion 122 may protrude inward from an inner circumference of the guide frame 120.

A portion of the inside of the protrusion 122 may be disposed between the display panel 110 and the light guide plate 130. A portion of the front surface of the display panel 110, which overlaps the protrusion 122 in the front and rear direction may be the non-display area 112.

The protrusion 122 may support an edge of the rear surface of the display panel 110 from the rear side. Also, the protrusion 122 may support the edge of the front surface of the light guide plate 130 from the front side.

A first heat insulating member 20 may be provided between the edge of the rear surface of the display panel 110 and a front surface of the protrusion 122 of the guide frame 120. the first heat insulating member 20 may extend along the edge of the display panel 110.

Also, a second heat insulating member 21 may be provided between the edge of the front surface of the light guide plate 130 and the rear surface of the protrusion 122. The second heat insulating member 21 may extend along the edge of the light guide plate 130.

Each of the heat insulating members 20 and 21 may be made of a material having low thermal conductivity. For example, each of the heat insulating members 20 and 21 may include at least one of polyethylene terephthalate (PET), polycarbonate (PC), or a silicone material.

The heat generated from the light source module 160 may be prevented from being transferred to the display panel 110 and the light guide plate 130 via the mounting housing 170, the back cover 180, and the guide frame 120 by the heat insulating member 20 and 21.

A reinforcement portion 123 protruding forward from the protrusion 122 to support the front panel 192 of the decor panel 190 may be provided on the guide frame 120.

The reinforcement portion 123 may pass through a lower side of the display panel 110 to support the front panel 192 of the decor panel 190 from the rear side.

The light source module 160 may include a plurality of optical elements 161, through which light is emitted, and a substrate 162 on which the optical elements 161 are mounted.

The optical element 161 may be disposed below the light guide plate 130 and emit light toward the light guide plate 130. For example, the optical element 161 may be a light emitting diode (LED). The plurality of optical elements 161 may be disposed to be spaced a predetermined interval from each other in the left and right direction.

The optical element 161 may be covered by a lens 163. The lens 163 covers the optical element 161 from the upper side and may be disposed below the light guide plate 130. Light emitted from the optical element 161 may pass through the lens 163 and then be incident into the light guide plate 130.

An assembly of the optical element 161 and the lens 163 may be called a light source.

The substrate 162 may extend in the left and right direction. The optical element 161 may be mounted on the substrate 162.

The mounting housing 170 may include a lower housing 171, on which the light source module 160 is mounted, and a rear housing 172 extending upward from a rear end of the lower housing 171.

However, when the backlight unit is provided as the direct type, the mounting housing 170 may not include the lower housing 171, and the light source module 160 may be mounted on the rear housing 172.

The lower housing 171 may be horizontally disposed. The lower housing 171 may support the light source module 160 from the lower side. The lower housing 171 may be spaced upward with respect to the inner circumference of the guide frame 120.

The rear housing 172 may dissipate heat that is generated from the light source module 160 mounted on the lower housing 171 and the conducted. That is, the rear housing 172 may act as a heat sink.

The rear housing 172 may be disposed between the light guide plate 130 and the back cover 180. The rear housing 172 may be disposed vertically. The rear housing 172 may contact the back cover 180.

A support portion 174 protruding forward to support the light guide plate 130 from the rear side may be disposed on the rear housing 172. The support portion 174 may extend in the left and right direction. The support portion 174 may contact the reflective sheet 150 to support the light guide plate 130.

The support portion 174 may be spaced upward from the light source module 160 and the lower housing 171.

The back cover 180 may be disposed vertically. The back cover 180 may cover the mounting housing 170, more specifically, the rear housing 172 from the rear side. The back cover 180 may thermally contact the rear housing 172. Thus, a portion of the heat conducted from the light source module 160 to the rear housing 172 may be conducted to the back cover 180.

A lower cover 181 may be disposed on a lower end of the back cover 180. The lower cover 181 may be integrated with the back cover 180.

The lower cover 181 may be bent forward from the lower end of the back cover 180 to cover the mounting housing 170 from the lower side. In more detail, the lower cover 181 may cover the lower housing 171 from the lower side. The lower cover 181 may be disposed between an inner circumference of the side frame 120 and the lower housing 171.

The decor panel 190 may be fixed by the screw 10. The screw 10 may be coupled to the lower cover 181 by sequentially passing through the decor panel 190 and the guide frame 120. Thus, the heat conducted from the back cover 180 to the lower cover 181 may be conducted to the screw 10.

In more detail, the screw 10 may sequentially pass through a first through-hole 194 defined in the decor panel 190 and a second through-hole 124 defined in the guide frame 120 and then be coupled to a coupling hole 182 defined in the lower cover 181.

The screw 10 may be provided in a plurality, which are spaced apart from each other in the left and right direction. Thus, each of the first through-hole 194, second through-hole 124, and the coupling hole 182 may be provided in plurality, which are spaced apart from each other in the left and right direction.

The first through-hole 194 may be defined to pass through the lower panel 191 of the decor panel 190. The first through-hole 194 may be defined to pass in the vertical direction. The first through-hole 194 may be disposed behind the protrusion 193.

An inner circumference of the first through-hole 194 may be spaced apart from the outer circumference of the screw 10. That is, an inner diameter of the first through-hole 194 may be greater than an outer diameter of the screw 10. Thus, the conduction of the heat of the screw 10 to the decor panel 190 may be minimized.

The second through-hole 124 may be defined to pass from the outer circumference to the inner circumference of the guide frame 120. The second through-hole 124 may be defined to pass in the vertical direction. The second through-hole 124 may be defined in a position corresponding to the first through-hole 194.

The inner circumference of the second through-hole 124 may be spaced apart from the outer circumference of the screw 10. That is, the second through-hole 124 may have an inner diameter greater than the outer diameter of the screw 10. Therefore, the conduction of the heat of the screw 10 to the guide frame 120 may be minimized.

The coupling hole 182 may be defined to pass in the vertical direction. A screw thread corresponding to the outer circumference of the screw 10 may be disposed on the inner circumference of the coupling hole 182. The coupling hole 182 may be defined in a position corresponding to each of the first through-hole 194 and the second through-hole 124.

An opening 173 in which an end of the screw 10 is disposed may be defined in the bottom surface of the coupling housing 170. In more detail, the opening 173 may be defined in the lower housing 171 and may be opened downward.

The opening 173 may perpendicularly pass through the lower housing 171. The light source module 160 may cover the opening 173 from the upper side.

The length of the screw 10 may be maintained lengthily while the screw 10 and the mounting housing 170 are spaced apart from each other by the opening 173 to secure reliability of coupling by the screw 10. Thus, the heat conducted from the light source module 160 to the mounting housing 170 may be prevented from being directly conducted to the screw 10.

The head 11 of the screw 10 may be provided on the lower end of the screw 10. The head 11 may have a diameter greater than that of the first through-hole 194. Thus, the head may be disposed below the lower panel 191 without being inserted into the first through-hole 194 and may restrict the lower panel 191 of the decor panel 190 in the vertical direction.

The heat insulating member 30 may be disposed between the head 11 of the screw 10 and the lower panel 191 of the decor panel 190. That is, the head 11 of the screw 10 and the lower panel 191 of the decor panel 190 may be spaced apart from each other in the vertical direction.

The heat insulating member 30 may have a ring shape surrounding the outer circumference of the screw 10.

The heat insulating member 30 may be made of a material having low thermal conductivity. The thermal conductivity of the heat insulating member 30 may be less than that of each of the mounting housing 170 and the back cover 180.

For example, each of the heat insulating members 20 and 21 may include at least one of polyethylene terephthalate (PET), polycarbonate (PC), or a silicone material.

The heat insulating member 30 may minimize the conduction of the heat, which is conducted from the lower cover 181 to the screw 10, to the lower panel 191 of the decor panel 190. Thus, the decor panel 190 may be prevented from excessively increasing in temperature to improve the reliability of the display device 100.

A recess portion 193 recessed upward may be defined in the lower panel 191 of the decor panel 190. The first through-hole 194 may be defined to pass through the recess portion 193. The heat insulating member 30 may be disposed in the recess portion 193.

A phenomenon in which the head 11 and the heat insulating member 30 of the screw 10 protrude downward may be minimized by the recess portion 193. Thus, the outer appearance of the display device 100 may be improved.

A long hole 195 extending in the left and right direction may be defined in the lower panel 191 of the decor panel 190. The long hole 195 may be defined to pass through the lower panel 191. Also, the long hole 195 may communicate with the recess portion 193.

The length of the long hole 195 in the left and right direction may be longer than that of the recess portion 193 in the left and right direction.

The long hole 195 may pass through a front side of the screw 10. In more detail, the long hole 195 may be spaced forward from the first through-hole 194.

The long hole 195 may pass between the front panel 192 and the first through-hole 194 with respect to a surface of the decor panel 190. The long hole 195 may pass between the barrier 193 and the first through-hole 194 with respect to a surface of the decor panel 190.

The long hole 195 may minimize the conduction of the heat, which is transferred from the screw 10 to the periphery of the first through-hole 194, to the front panel 192 and the barrier 193 of the decor panel 190. In more detail, since the heat bypasses the long hole 195 and is conducted to the front panel 192 and the barrier 193, a heat conduction path may be longer compared to a case in which the long hole 195 is not provided.

Thus, the front panel 192 and the barrier 193 of the decor panel 190 may be prevented from excessively increasing in temperature to more improve the reliability of the display device 100.

A cutoff hole 195a extending backward may be defined in each of both ends of the long hole 195. The cutoff hole 195a and the long hole 195 may communicate with each other. Thus, the heat conduction path may be longer without further increasing in length of the long hole 195 in the left and right direction.

Figure 5:
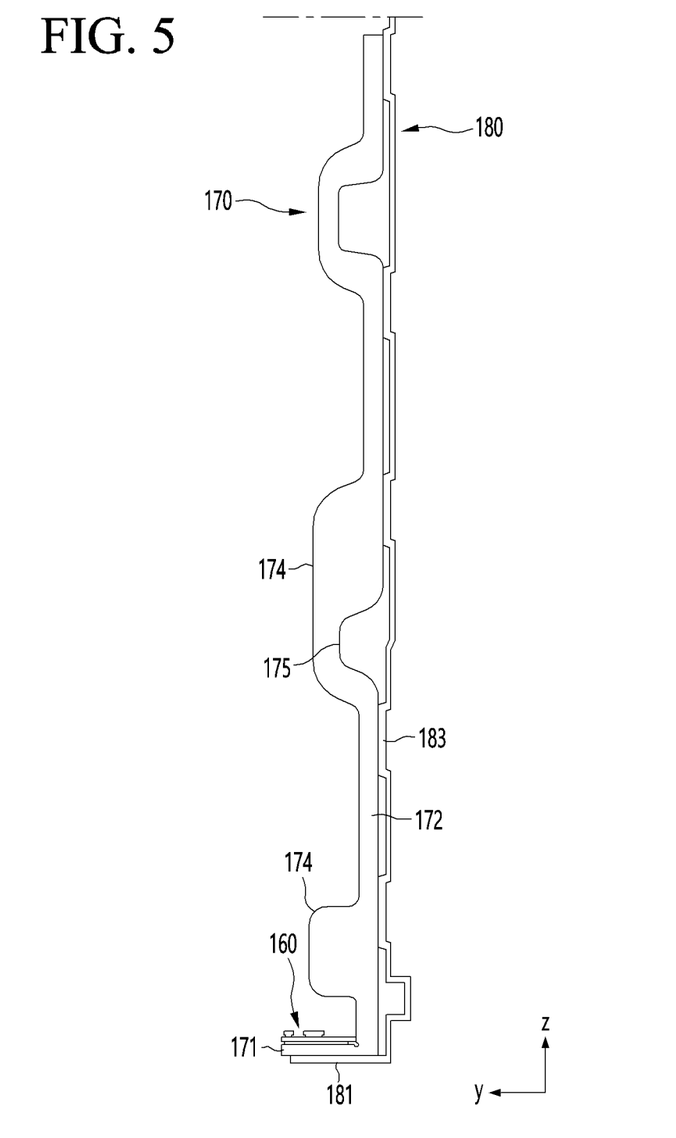
FIG. 5 is a view illustrating a mounting housing and a back cover according to an embodiment.

FIG. 5 is a view illustrating the mounting housing and the back cover according to an embodiment.

A plurality of protrusions 183 protruding forward and contacting the rear surface of the mounting housing 170 may be disposed on the back cover 180. The plurality of protrusions 183 may allow the back cover 180 and the mounting housing 170 to thermally contact each other. The plurality of protrusions 183 may contact the rear housing 172 of the mounting housing 170.

When compared to a case in which the protrusions 183 are not provided, a thermal contact area between the mounting housing 170 and the back cover 180 may be reduced. Also, since a gap occurs between the rear surface of the mounting housing 170 and the front surface of the back cover 180 by the protrusion 183, an insulating effect may be obtained by an air layer of the gap.

That is, the heat conducted from the light source module 160 to the mounting housing 170 may be prevented from being excessively conducted to the back cover 180. Thus, the heat that is conducted to the decor panel 190 through the lower cover 181 and the screw 10 may be minimized.

A recess groove 175 recessed forward may be defined in the rear surface of the mounting housing 170. In more detail, the recess groove 175 may be defined in the rear housing 172. The recess groove 175 may extend in the left and right direction, and both ends of the recess groove 175 may be opened.

The recess groove 175 may be defined behind the support portion 174 of the mounting housing 170. In more detail, the support portion 174 may be provided in plurality, which are spaced apart from each other in the vertical direction, and the recess groove 175 may be defined behind at least a portion of the plurality of support portions 174.

The inside of the recess groove 175 may communicate with the gap defined between the front surface of the back cover 180 and the rear surface of the mounting housing 170. Thus, an effect in which the air layer between the mounting housing 170 and the back cover 180 becomes thicker may be obtained, and the heat insulating effect between the mounting housing 170 and the back cover 180 may be improved.

Figure 6:
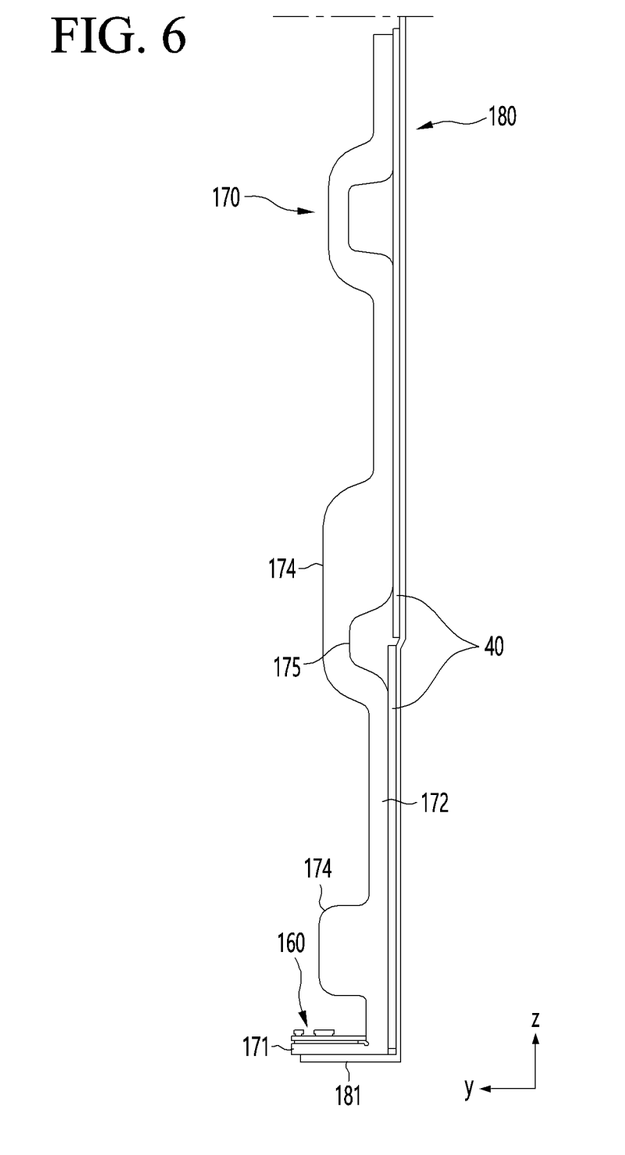
FIG. 6 is a view illustrating a mounting housing and a back cover according to another embodiment.

FIG. 6 is a view illustrating a mounting housing and a back cover according to another embodiment.

Hereinafter, contents duplicated with the foregoing embodiment will be omitted, and differences will be mainly described.

In this embodiment, a heat insulating pad 40 instead of the protrusion 183 (see FIG. 5) of the back cover 180 may be disposed between a back cover 180 and a mounting housing 170.

The heat insulating pad 40 may be disposed between a rear surface of the mounting housing 170 and a front surface of the back cover 180. That is, the heat insulating pad 40 may be disposed between a rear housing 172 and the back cover 180.

The heat insulating pad 40 may be integrally provided or may be provided in plurality, which are separated from each other.

Conduction of heat, which is conducted from a light source module 160 to the mounting housing 170, to the back cover 180 may be minimized by the heat insulating pad 40. Thus, heat that is conducted to a decor panel 190 through a lower cover 181 and a screw 10 may be minimized.

The heat insulating pad 40 may cover a recess groove 175 defined in the mounting housing 170 from a rear side. Therefore, an insulating effect on the back cover 180 may be more improved by an air layer within the recess groove 175.

According to the embodiment, the heat insulating member may be disposed between the lead of the screw and the lower panel. Therefore, the heat generated in the light source module and conducted to the screw through the mounting housing, the back cover, and the lower cover may be prevented from being conducted to the lower panel. As a result, the increase in temperature of the decor panel that is easily reachable by the user's hand, particularly the front panel may be minimized to improve the reliability of the display device.

In addition, the inner circumference of the through-hole defined in the lower panel and the outer circumference of the screw may be spaced apart from each other. Thus, the transfer of the heat of the screw to the lower panel may be minimized.

In addition, the long hole extending in the left and right direction to pass between the screw and the front panel may be defined in the lower panel. Therefore, since the heat conduction path up to the front panel bypasses the long hole, the heat conduction path may be lengthened. Therefore, the temperature of the front panel may be prevented from excessively increasing.

In addition, the recess portion recessed upward and communicating with the long hole may be provided in the lower panel. As a result, the downward protrusion of the heat insulating member and the head of the screw may be minimized to improve the outer appearance of the display device.

In addition, the length of the long hole in the left and right direction may be greater than that of the recess portion, and the cutoff hole extending backward may be defined in each of both the ends of the long hole. Thus, the length of the heat conduction path may increase.

In addition, the opening in which the end of the screw is disposed may be defined in the bottom surface of the mounting housing. Therefore, since the end of the screw does not thermally contact the mounting housing, the heat of the mounting housing may be prevented from being directly conducted to the screw.

In addition, the plurality of protrusions contacting the rear surface of the mounting housing may be disposed on the back cover. As a result, the thermal contact area between the mounting housing and the back cover may be reduced, and the air layer may be defined by the gap between the mounting housing and the back cover. Therefore, the heat conducted from the mounting housing to the decor panel through the back cover and the screw may be reduced.

In addition, the heat insulating pad may be provided between the back cover and the mounting housing. Therefore, the heat conducted from the mounting housing to the decor panel through the back cover and the screw may be reduced.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the disclosure but by the appended claims, and all differences within the scope will be construed as being included in the present disclosure.

What is claimed is:

1. A display device comprising:
a display panel;
a light guide plate disposed behind the display panel;
a light source module configured to emit light toward the light guide plate;
a mounting housing on which the light source module is mounted, the mounting housing being made of a metal material;
a back cover configured to cover the mounting housing from a rear side;
a lower cover bent forward from a lower end of the back cover to cover the mounting housing from a lower side;
a guide frame configured to surround a circumference of the display panel and cover the lower cover;
a decor panel comprising a lower panel configured to cover the guide frame from a lower side and a front panel extending upward from a front end of the lower panel;
a screw coupled to the lower cover by sequentially passing through the lower panel and the guide frame; and
a heat insulating member disposed between a head of the screw and the lower panel,
wherein a long hole extending in a horizontal direction is defined in the lower panel, and the long hole passes between the front panel and the screw with respect to a surface of the decor panel, and
wherein a recess portion which is recessed upward, in which the heat insulating member is disposed, and which communicates with the long hole is defined in the lower panel.

2. The display device according to claim 1, wherein a first through-hole through which the screw passes is defined in the lower panel,
a second through-hole through which the screw passes is defined in the guide frame, and
an inner circumference of the first through-hole and an inner circumference of the second through-hole are spaced apart from an outer circumference of the screw.

3. The display device according to claim 1, wherein a length of the long hole in the horizontal direction is longer than that of the recess portion in the horizontal direction.

4. The display device according to claim 1, wherein a plurality of protrusions protruding forward and contacting a rear surface of the mounting housing are disposed on the back cover.

5. The display device according to claim 4, wherein a recess groove recessed forward is defined in the rear surface of the mounting housing, and
the recess groove communicates with a gap defined between a front surface of the back cover and the rear surface of the mounting housing.

6. The display device according to claim 1, further comprising a heat insulating pad provided between a rear surface of the mounting housing and a front surface of the back cover.

7. The display device according to claim 6, wherein a recess groove recessed forward is defined in the rear surface of the mounting housing, and
the heat insulating pad is configured to cover the recess groove from the rear side.

8. The display device according to claim 1, wherein an opening in which an end of the screw is disposed is defined in a bottom surface of the mounting housing.

9. A display device comprising:
a display panel;
a light guide plate disposed behind the display panel;
a light source module configured to emit light toward the light guide plate;
a mounting housing on which the light source module is mounted, the mounting housing being made of a metal material;
a back cover configured to cover the mounting housing from a rear side;
a lower cover bent forward from a lower end of the back cover to cover the mounting housing from a lower side;
a guide frame configured to surround a circumference of the display panel and cover the lower cover;
a decor panel comprising a lower panel configured to cover the guide frame from a lower side and a front panel extending upward from a front end of the lower panel;
a screw coupled to the lower cover by sequentially passing through the lower panel and the guide frame; and
a heat insulating member disposed between a head of the screw and the lower panel,
wherein the lower panel comprises:
a through-hole through which the screw passes; and
a long hole which extends in a horizontal direction and passes between the front panel and the screw with respect to a surface of the decor panel, and wherein a recess portion which is recessed upward, in which the heat insulating member is disposed, and which communicates with the long hole is defined in the lower panel.

10. The display device according to claim 9, wherein an inner circumference of the through-hole is spaced apart from an outer circumference of the screw.

11. The display device according to claim 9, wherein the long hole passes between the front panel and the through-hole with respect to the surface of the decor panel.

12. The display device according to claim 9, wherein the heat insulating member has an annular shape.

13. The display device according to claim 9, wherein a cutoff hole extending backward is defined in each of both ends of the long hole.

* * * * *